Patented Oct. 24, 1922.

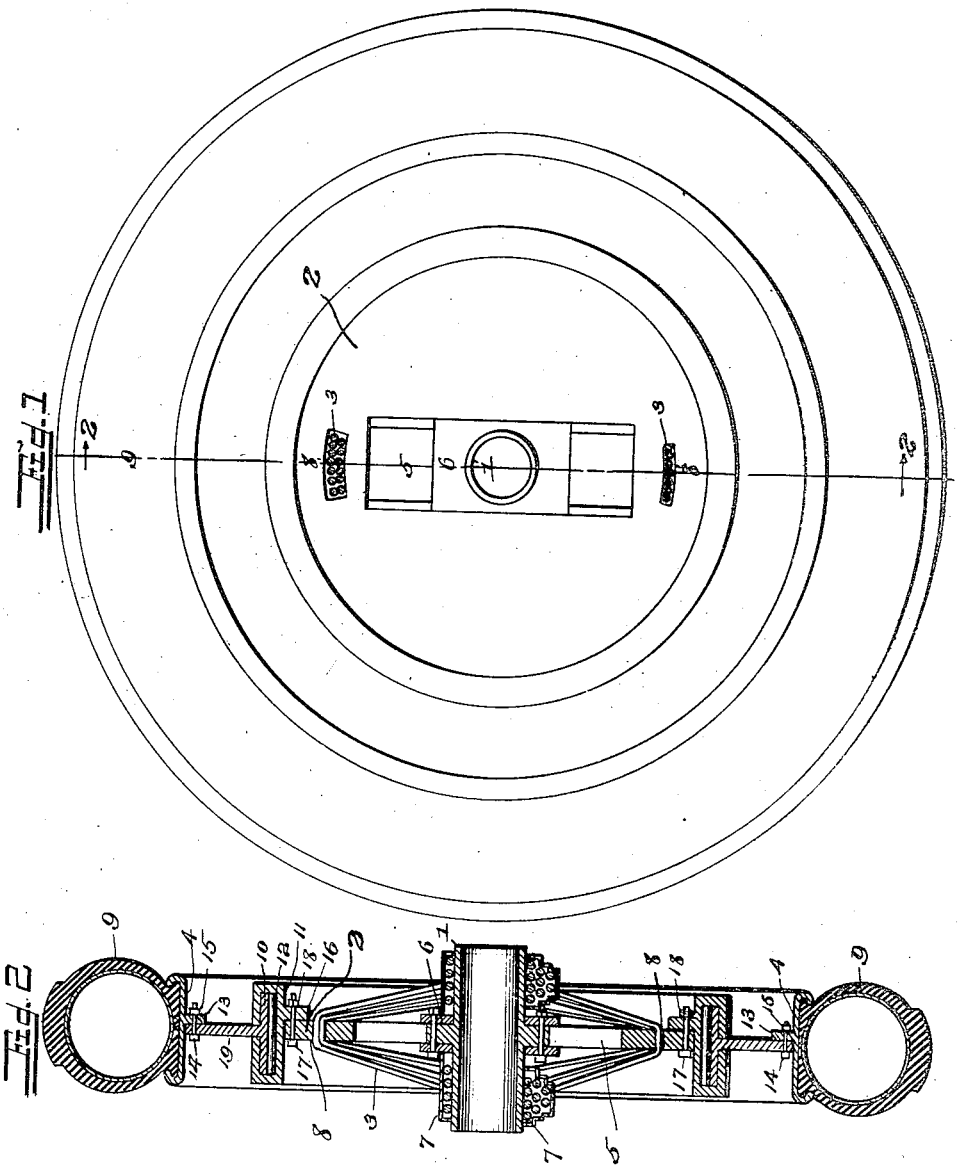

1,432,805

UNITED STATES PATENT OFFICE.

JAMES GEORGE TAMPLIN, OF DAYTON, OHIO.

SHOCK-ABSORBER WHEEL.

Application filed November 17, 1921. Serial No. 515,797.

*To all whom it may concern:*

Be it known that I, JAMES G. TAMPLIN, a citizen of the United States, residing at Dayton, in the county of Montgomery and State of Ohio, have invented certain new and useful Improvements in Shock-Absorber Wheels, of which the following is a specification.

This invention relates to shock absorbing wheels in general, and more particularly to shock absorbing means so devised as to be especially adapted to the structure of aircraft.

The wheels of aircraft landing gears are often necessarily subjected to a great amount of strain in all directions. The usual type of shock absorbing gear wheel is adapted to compensate the vertical thrust. This precautionary provision, however, is found insufficient for taking up lateral thrusts as well as those in a vertical plane.

It is therefore the object of the present invention to provide a shock absorbing wheel for aircraft which will relieve the landing gear of vertical and lateral thrusts. It is also proposed to provide such a wheel that the central portion or hub thereof shall be non-rotary as well as the axle upon which the hub is mounted, the outer portion or rim of the wheel being adapted to carry a tire and rotate about the stationary hub as an axis.

With the foregoing and other objects in view, which shall appear as the description proceeds, the invention resides in the combination of parts and in the details of construction hereinafter described and claimed, it being understood that changes in the precise embodiment of the invention herein disclosed, may be made within the scope of what is claimed without the departing from the spirit of the invention, the specific embodiment of which is illustrated in the attached drawings, in which:

Figure 1 is a side elevation of the entire wheel.

Figure 2 is a vertical section taken along line 2—2 of Figure 1.

Referring more particularly to the drawings, it will be seen that the device consists primarily of four essential parts, namely: the hub 1, disk 2, elastic shock-absorbing element 3, and tire-carrying rim 4. The hub 1 is keyed to the spindle of the airplane chassis which carries the wheel so that the hub does not rotate on the spindle. The hub 1 extends through a diametrical slot 5 in the disk 2, and has a cross-head 6 fixedly secured thereto and working within the slot to guide the hub and prevent rotation of the disk on the hub. The shock absorbing element may consist of a plurality of rubber cords 3 in accordance with the usual practice. These cords 3 are arranged in opposed sets and pass around the hub 1 through the retainers 7 and extend through the slots 8 in the disk 2. The shock absorbing members will thus absorb landing shocks in both vertical and lateral directions.

The outer rim 4 bearing the tire 9 has the annular flange 10 journaled in the annular guide 11 provided on the periphery of the disk 2. Suitable anti-friction members such as roller bearings 12 are interposed between the relatively movable parts, namely: the outer rotating rim and the stationary disk in order to reduce the friction therebetween and allow the rim and tire to rotate freely about the disk as an axis.

The rim 4 may be provided with the downwardly depending flange 13, slightly off center. This flange 13 is connected by means of the bolt 14 and nut 15 to the bearing member 19 which bears upon the roller bearings 12 with the guide 11. The guide 11 is attached to the disk 2 by means of a bolt 17 passing through the radially inwardly extending flange 16 of the guide 11 and the disk 2 and is retained by means of a nut 18.

It will be clearly seen by reference to the foregoing description that any shock imparted to the wheel in a vertical plane will be absorbed by the upper and lower set of shock absorber resilient cords acting in opposed direction. It will be further noticed that any shock in a lateral plane will be absorbed by a tension on the resilient cords produced by a pulling forward thereon to the left or right.

The proposed device is further advantageous in view of the fact that it may be easily assembled or disassembled, the rim being demountable and the rotatable and stationary members of the device also being capable of being easily attached or detached.

Having thus described my invention, I claim:

1. In combination, in a resilient wheel, a non-rotary hub adapted to be mounted on a non-rotary axle, a non-rotary disc mounted on said hub, a rotary outer rim adapted to carry a tire, said rim being adapted to rotate about said disc as an axis, a cord retainer arranged about said hub, an upper and a lower slot in said disc, and a plurality of resilient cords connected therebetween.

2. In combination, in a resilient wheel, a non-rotary hub adapted to be mounted on a non-rotary axle, a non-rotary disc mounted on said hub, a rotary outer rim adapted to carry a tire, said rim being adapted to rotate about said disc as an axis, a cord retainer arranged about said hub, an upper and a lower slot in said disc, and a plurality of resilient cords connected therebetween, a cross-head mounted on said hub and adapted to slide vertically in a diametrical slot in said disc against the action of said resilient cords.

3. In combination, in a resilient wheel, a non-rotary hub, mounted on a non-rotary axle and carrying a non-rotary disc, a channeled guide around the periphery of said disc to receive roller bearings, said guide being detachably secured to said disc, an outer rotary tire-carrying detachable rim provided with a bearing member, said rim and bearing member being adapted to rotate on said roller bearings about said stationary disc as an axis, a cord retainer arranged about said hub, an upper and a lower slot in said disc, and a plurality of resilient cords connected therebetween.

4. In combination, in a resilient wheel, a non-rotary hub, mounted on a non-rotary axle and carrying a non-rotary disc, a channeled guide around the periphery of said disc to receive roller bearings, said guide being detachably secured to said disc, an outer rotary tire-carrying detachable rim provided with a bearing member, said rim and bearing member being adapted to rotate on said roller bearings about said stationary disc as an axis, a cord retainer arranged about said hub, an upper and a lower slot in said disc, and a plurality of resilient cords connected therebetween, a cross-head mounted on said hub and adapted to slide vertically in a diametrical slot in said disc against the action of said resilient cords.

In testimony whereof I have affixed my signature.

JAMES GEORGE TAMPLIN.